(12) United States Patent
Inoue et al.

(10) Patent No.: US 8,328,783 B2
(45) Date of Patent: Dec. 11, 2012

(54) DRUG CONTAINER AND MULTILAYER FILM

(75) Inventors: Fujio Inoue, Naruto (JP); Isamu Tateishi, Naruto (JP); Yasushi Morimoto, Naruto (JP); Tatsuro Tsuruoka, Naruto (JP); Yasushi Nagata, Naruto (JP)

(73) Assignee: Otsuka Pharmaceutical Factory, Inc., Tokushima (JP)

( * ) Notice: Subject to any disclaimer, the term of this patent is extended or adjusted under 35 U.S.C. 154(b) by 157 days.

(21) Appl. No.: 12/669,785

(22) PCT Filed: Jul. 15, 2008

(86) PCT No.: PCT/JP2008/062765
§ 371 (c)(1),
(2), (4) Date: Jun. 28, 2010

(87) PCT Pub. No.: WO2009/014032
PCT Pub. Date: Jan. 29, 2009

(65) Prior Publication Data
US 2010/0298804 A1  Nov. 25, 2010

(30) Foreign Application Priority Data
Jul. 20, 2007 (JP) ................................. 2007-189650

(51) Int. Cl.
*A61B 19/00* (2006.01)
*B32B 27/08* (2006.01)

(52) U.S. Cl. .................... 604/410; 604/329; 428/516

(58) Field of Classification Search .................. 604/329; 428/516
See application file for complete search history.

(56) References Cited

U.S. PATENT DOCUMENTS

| | | | |
|---|---|---|---|
| 5,478,617 A * | 12/1995 | Watanabe et al. | 428/35.2 |
| 5,520,975 A | 5/1996 | Inoue et al. | |
| 6,203,535 B1 * | 3/2001 | Barney et al. | 604/408 |
| 6,773,775 B2 * | 8/2004 | Inoue et al. | 428/35.4 |
| 2005/0208240 A1 | 9/2005 | Manabe et al. | |
| 2008/0063825 A1 | 3/2008 | Mori et al. | |
| 2009/0032426 A1 | 2/2009 | Tateishi et al. | |
| 2009/0209935 A1 | 8/2009 | Inoue et al. | |

(Continued)

FOREIGN PATENT DOCUMENTS

JP  2002-301796  10/2002

(Continued)

OTHER PUBLICATIONS

International Preliminary Report on Patentability for PCT/JP2008/062765, dated Feb. 9, 2010.

(Continued)

*Primary Examiner* — Melanie Hand
*Assistant Examiner* — Andrew S Lo
(74) *Attorney, Agent, or Firm* — Finnegan, Henderson, Farabow, Garrett & Dunner, L.L.P.

(57) ABSTRACT

A drug container of a multilayer film including a first layer (1) composed of a linear ethylene/α-olefin copolymer having a density of 0.930 to 0.950 g/cm$^3$, a second layer (2) and a fourth layer (4) each composed of a mixture containing a linear ethylene/α-olefin copolymer having a density of 0.860 to 0.920 g/cm$^3$ in a weight ratio of 95:5 to 40:60, a third layer (3) composed of a polycycloolefin, and a fifth layer (5) composed of a mixture containing a polyethylene and a polypropylene, the fifth layer 5 serving as an innermost layer.

4 Claims, 3 Drawing Sheets

U.S. PATENT DOCUMENTS

2009/0299324 A1 12/2009 Inoue et al.
2009/0325771 A1 12/2009 Inoue et al.

FOREIGN PATENT DOCUMENTS

| | | |
|---|---|---|
| JP | 2002-361811 | 12/2002 |
| JP | 2004-121824 | 4/2004 |
| JP | 2005-525952 | 9/2005 |
| JP | 2006-21504 | 1/2006 |
| JP | 2006-306465 | 11/2006 |
| WO | WO 94/17772 A1 | 8/1994 |
| WO | WO 2006/043459 A1 | 4/2006 |
| WO | WO 2006/118034 A1 | 11/2006 |
| WO | WO 2007/063638 A1 | 7/2007 |

OTHER PUBLICATIONS

Japanese Search Report for International Application No. PCT/JP2008/062765, mailing date Oct. 14, 2008.

* cited by examiner

DRUG CONTAINER AND MULTILAYER FILM

TECHNICAL FIELD

The present invention relates to a drug container, and a multilayer film to be used for production of the drug container.

BACKGROUND ART

Conventionally, multilayer films of polyolefin resins such as polypropylenes and polyethylenes are widely used for formation of drug containers such as infusion solution bags. In recent years, multi-chamber containers in which a plurality of drugs can be separately contained and mixed with each other for use are widely employed in the field of medical containers.

For such a multi-chamber container, it is important to properly control the unsealability of a weakly sealed portion which isolates adjacent container portions from each other. In order to stably store a drug in the multi-chamber container, it is necessary to form the multi-chamber container from a film having an excellent gas barrier property. It is also important to take into consideration the unsealability as well as the transparency, the mechanical strength, the sterilization heat resistance, the antiblocking property and other properties of a multilayer film for the multi-chamber container, and the prevention of exudation of additives from the multilayer film into the inside of the container (contamination resistance). Therefore, the layered structure of the multilayer film is designed so as to properly control these properties.

Patent Document 1 discloses a five-layer film including a first layer (outermost layer) and a fifth layer (innermost layer) each composed of a linear ethylene/α-olefin copolymer having a density of 0.930 to 0.950 g/cm$^3$, a second layer and a fourth layer each composed of a resin mixture containing a linear very-low-density ethylene/α-olefin copolymer prepared by employing a metallocene catalyst and having a density of 0.860 to 0.920 g/cm$^3$ and a high-density polyethylene having a density of 0.955 to 0.970 g/cm$^3$, and a third layer composed of a cycloolefin copolymer. Patent Document 1 also discloses a container formed of the five-layer film.

Patent Document 2 discloses a medical container formed of a film including a resin composition layer (A) composed of a resin composition containing a thermoplastic norbornene polymer and a polyethylene, coating layers (B) bonded to opposite surfaces of the resin composition layer (A) and each composed of a composition containing an ethylene/α-olefin copolymer having a density of 880 to 930 kg/m$^3$ with the ratio (Mw/Mn) of the weight average molecular weight (Mw) to the number average molecular weight (Mn) being 1.5 to 4.0, and polyethylene layers (C) each composed of a high-density polyethylene and respectively bonded to the coating layers (B).

Patent Document 3 discloses a four-layer film including a surface layer composed of an ethylene/α-olefin copolymer having a density of 0.935 to 0.950 g/cm$^3$ and having a thickness of 10 to 50 μm, a flexible layer composed of an ethylene/α-olefin copolymer having a density of 0.860 to 0.930 g/cm$^3$ and having a thickness of 100 to 200 μm, a barrier layer composed of a resin mixture containing 60 to 95% by weight of a polycycloolefin and 5 to 40% by weight of an ethylene/α-olefin copolymer having a density of 0.900 to 0.965 g/cm$^3$ and having a thickness of 10 to 80 μm, and a seal layer composed of an ethylene/α-olefin copolymer having a density of 0.910 to 0.950 g/cm$^3$ and having a thickness of 5 to 80 μm. Patent Document 3 also discloses a container formed of the four-layer film.

Patent Document 4 discloses a flexible plastic film including a seal layer composed of a mixture containing a propylene/α-olefin random copolymer and a polypropylene homopolymer, a first flexible layer provided on a surface of the seal layer and composed of a mixture of a propylene/α-olefin random copolymer or the like and an ethylene/α-olefin copolymer elastomer, a reinforcement layer provided on a surface of the first flexible layer and composed of a polycycloolefin or the like, a second flexible layer provided on a surface of the reinforcement layer and composed of a mixture of a propylene/α-olefin copolymer elastomer or the like and an ethylene/α-olefin copolymer elastomer, and an outermost layer provided on a surface of the second flexible layer and composed of a propylene/α-olefin random copolymer or the like. Patent Document 4 also discloses a container formed of the flexible plastic film.

Patent Document 1: JP-A-2002-301796
Patent Document 2: JP-A-2004-121824
Patent Document 3: JP-T-2005-525952
Patent Document 4: JP-A-2006-21504

DISCLOSURE OF THE INVENTION

Problems to be Solved by the Invention

The drug containers formed of the films disclosed in Patent Documents 1 to 4 are excellent in gas barrier property, because the multilayer films for the containers each include a polycycloolefin.

In recent years, however, a drug container for containing a drug, particularly an antibiotic, is required to have a capability of suppressing contamination of the drug with an external contaminant in the drug container, i.e., required to have an excellent contamination resistance. Further, the multilayer films are unsatisfactory in sterilization heat resistance, because the polycycloolefin does not have sufficient adhesiveness to the polyolefin. In addition, the multilayer films are required to have more excellent transparency for easier visual checking of the inside of the drug container after the sterilization.

It is therefore an object of the present invention to provide a drug container excellent in unsealability, gas barrier property, contamination resistance, heat resistance, antiblocking property and transparency, and to provide a multilayer film to be used for production of the drug container.

Means for Solving the Problems

To achieve the object described above, an inventive drug container includes: a front side film; a rear side film superposed on the front side film; and a drug containing portion defined between the front side film and the rear side film by a heavily sealed portion; the drug containing portion including a plurality of container portions including a powdery drug containing portion for containing a powdery drug and a solvent containing portion for containing a solvent for the powdery drug; the container portions being isolated from each other by a weakly sealed portion which is unsealed when internal pressures of the container portions are increased; the front side film and the rear side film each including a first layer provided on an outermost side, a second layer provided on the first layer, a third layer provided on the second layer, a fourth layer provided on the third layer, and a fifth layer provided on the fourth layer and defining a seal surface of the front or rear side film; the first layer being composed of a linear ethylene/α-olefin copolymer having a density of 0.930 to 0.950 g/cm$^3$ or a mixture containing a linear ethylene/α-olefin copolymer having a density of 0.930 to 0.950 g/cm$^3$ and a polyethylene having a density of 0.955 to 0.970 g/cm$^3$ in a weight ratio of 70:30 to 90:10; the second and fourth layers being each composed of a mixture containing a linear ethylene/α-olefin copolymer having a density of 0.860 to 0.920 g/cm$^3$ and a linear ethylene/α-olefin copolymer having a density of 0.930 to 0.950 g/cm$^3$ in a weight ratio of 95:5 to 40:60 or a mixture containing a linear ethylene/α-olefin copolymer having a density of 0.860 to 0.920 g/cm$^3$ and a polyethylene having a density of 0.955 to 0.970 g/cm$^3$ in a weight ratio of 95:5 to 80:20; the third layer being composed of a polycycloolefin or a mixture of a polycycloolefin and a polyethylene; the fifth layer being composed of a mixture containing a polyethylene and a polypropylene in a weight ratio of 90:10 to 10:90.

The multilayer film for the drug container is imparted with the gas barrier property and the contamination resistance by the third layer of the multilayer film. The multilayer film is imparted with the unsealability and a capability of preventing the blocking during a sterilization process (antiblocking property) by the fifth layer. Further, the second layer and the fourth layer respectively ensure adhesion between the first layer and the third layer and adhesion between the third layer and the fifth layer. As a result, the entire multilayer film has excellent heat resistance, and maintains the transparency even after the sterilization process. In addition, the multilayer film is entirely imparted with flexibility without deterioration in gas barrier property and impact resistance. Further, the first layer imparts the multilayer film with excellent mold releasability in the formation of the sealed portions of the drug container.

The drug container is suitable as a multi-chamber container, for example, which is capable of separately containing a plurality of drugs. Further, the drug container is excellent in contamination resistance and, therefore, is suitable as a drug container for containing an antibiotic.

The inventive drug container is preferably designed such that:
(a) the second layer of each of the front and rear side films has a thickness that is not less than twice that of the fourth layer; or
(b) the second layer of each of the front and rear side films has the same thickness as the fourth layer.

In the case (a), it is possible to further alleviate the possibility of the exudation of additives into the inside of the drug container from the resin of the fourth layer while maintaining the flexibility of the multilayer film.

In the case (b), on the other hand, the production of the multilayer film is facilitated, thereby reducing the production costs.

In the inventive drug container, the third layer of each of the front and rear side films is composed of the mixture of the polycycloolefin and the polyethylene, and the polyethylene is present in a proportion of not greater than 30% by weight based on the total weight of the mixture of the polycycloolefin and the polyethylene.

In this case, the adhesion of the third layer to the second layer and the fourth layer can be improved.

In the inventive drug container, the fifth layer of each of the front and rear side films has a thickness that is 15 to 20% of the overall thickness of the front or rear side film.

In this case, the antiblocking property of the multilayer film can be further improved without impairing the effects of the other layers.

An inventive multilayer film includes: a first layer; a second layer provided on the first layer; a third layer provided on the second layer; a fourth layer provided on the third layer; and a fifth layer provided on the fourth layer; the first layer being composed of a linear ethylene/α-olefin copolymer having a density of 0.930 to 0.950 g/cm$^3$ or a mixture containing a linear ethylene/α-olefin copolymer having a density of 0.930 to 0.950 g/cm$^3$ and a polyethylene having a density of 0.955 to 0.970 g/cm$^3$ in a weight ratio of 70:30 to 90:10; the second and fourth layers being each composed of a mixture containing a linear ethylene/α-olefin copolymer having a density of 0.860 to 0.920 g/cm$^3$ and a linear ethylene/α-olefin copolymer having a density of 0.930 to 0.950 g/cm$^3$ in a weight ratio of 95:5 to 40:60 or a mixture containing a linear ethylene/α-olefin copolymer having a density of 0.860 to 0.920 g/cm$^3$ and a polyethylene having a density of 0.955 to 0.970 g/cm$^3$ in a weight ratio of 95:5 to 80:20; the third layer being composed of a polycycloolefin or a mixture of a polycycloolefin and a polyethylene; the fifth layer being composed of a mixture containing a polyethylene and a polypropylene in a weight ratio of 90:10 to 10:90.

The multilayer film is employed as the front and rear side films for the production of the drug container. Such multilayer films are stacked with their fifth layers opposed to each other to form a seal interface, whereby the drug container is provided which is excellent in unsealability, gas barrier property, contamination resistance, heat resistance, antiblocking property and transparency.

Effects of the Invention

According to the present invention, the drug container excellent in unsealability, gas barrier property, contamination resistance, heat resistance, antiblocking property and transparency, and the multilayer film for the production of the drug container are provided. Therefore, the present invention is advantageously applied to a multi-chamber container for separately containing a plurality of drugs and a drug container for containing an antibiotic, and to a material for the production of these containers.

DESCRIPTION OF REFERENCE CHARACTERS

1: First layer (outermost layer), 2: Second layer, 3: Third layer (intermediate layer), 4: Fourth layer, 5: Fifth layer (innermost layer), 6: Drug container, 7: Front side film (multilayer film), 8: Rear side film (multilayer film), 9: Heavily sealed portion, 10: First weakly sealed portion, 11: Second weakly sealed portion, 12: First container portion (solvent containing portion), 13: Second container portion (powdery drug containing portion), 14: Third container portion (empty container portion)

EMBODIMENTS OF THE INVENTION

Figure 1:
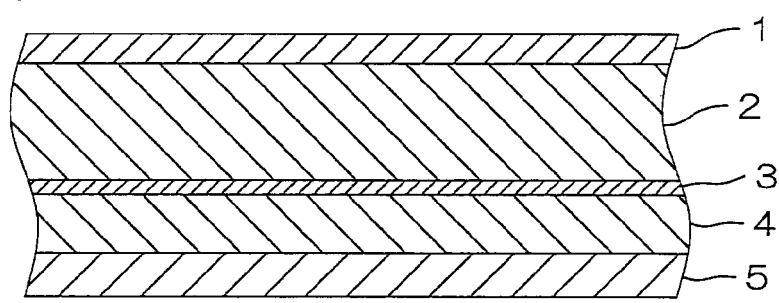
FIG. 1 is a schematic structural diagram showing the layered structure of an inventive multilayer film.

Referring to FIG. 1, the multilayer film includes a first layer 1 defining one of opposite surfaces thereof, a second layer 2 provided on the first layer 1, a third layer 3 provided on the second layer 2, a fourth layer 4 provided on the third layer 3, and a fifth layer 5 provided on the fourth layer 4 and defining the other surface thereof.

The first layer 1 defines an outermost layer of a drug container. Therefore, the first layer 1 is required to be excellent in mechanical strength (particularly, tensile strength) and heat resistance. Further, the first layer 1 is preferably excellent in transparency and flexibility.

The first layer 1 is composed of:
(A) a linear ethylene/α-olefin copolymer having a density of 0.930 to 0.950 g/cm$^3$; or
(B) a mixture containing a linear ethylene/α-olefin copolymer having a density of 0.930 to 0.950 g/cm$^3$ and a polyethylene having a density of 0.955 to 0.970 g/cm$^3$ in a weight ratio of 70:30 to 90:10.

The linear ethylene/α-olefin copolymer having a density of 0.930 to 0.950 g/cm$^3$ for the substance (A) or the mixture (B) particularly preferably has a density of 0.935 to 0.945 g/cm$^3$, further preferably about 0.940 g/cm$^3$ (as measured in conformity with ASTM D1505) in the aforesaid range. In the present invention, the densities of materials for the multilayer film are all measured in conformity with ASTM D1505.

The linear ethylene/α-olefin copolymer having a density of 0.930 to 0.950 g/cm$^3$ preferably has a melting point of 120° C. to 130° C. as measured in conformity with ASTM D2117, and a melt flow rate (MFR) of 1.5 to 2.5 g/10 minutes as measured in conformity with ASTM D1238 (at a temperature of 190° C. with a load of 2.16 kg). In the following description, the melting points of the materials for the multilayer film are all measured in conformity with ASTM D2117. Further, the MFRs of the materials for the multilayer film are all measured in conformity with ASTM D1238 (at a temperature of 190° C. with a load of 2.16 kg).

Exemplary α-olefins for the linear ethylene/α-olefin copolymer having a density of 0.930 to 0.950 g/cm$^3$ include α-olefins having 3 to 12 carbon atoms, such as propylene, butene-1, pentene-1, hexene-1, 4-methylpentene-1, heptene-1, octene-1, nonene-1, decene-1, undecene-1 and dodecene-1, among which butene-1 is preferred.

A commercially available linear ethylene/α-olefin copolymer having a density of 0.930 to 0.950 g/cm$^3$ may be used, and specific examples thereof include linear polyethylenes (linear ethylene/butene-1 copolymers ULTZEX (registered trade mark) series) available from Prime Polymer Co., Ltd., SUMIKACENE series available from Sumitomo Chemical Co., Ltd., and MORETEC series available from Idemitsu Petrochemical Co., Ltd.

The polyethylene having a density of 0.955 to 0.970 g/cm$^3$ for the mixture (B) particularly preferably has a density of about 0.965 g/cm$^3$ in the aforesaid range.

A commercially available polyethylene having a density of 0.955 to 0.970 g/cm$^3$ may be used, and specific examples thereof include high-density polyethylenes NEOZEX (registered trade mark) series available from Prime Polymer Co., Ltd., SUNTEC series available from Asahi Kasei Corporation, and SHOREX series available from Showa Denko K.K., and STAFLENE available from Nippon Petrochemicals Co., Ltd.

Where the material for the first layer 1 is the mixture (B), the polyethylene having a density of 0.955 to 0.970 g/cm$^3$ is blended in order to further improve the heat resistance of the first layer 1 and the mold releasability in the heat sealing.

Where the material for the first layer 1 is the mixture (B), a mixing weight ratio between the linear ethylene/α-olefin copolymer having a density of 0.930 to 0.950 g/cm$^3$ and the polyethylene having a density of 0.955 to 0.970 g/cm$^3$ is preferably 70:30 to 90:10, more preferably 75:25 to 85:15. If the proportion of the polyethylene having a density of 0.955 to 0.970 g/cm$^3$ (herein referred to simply as "high-density polyethylene") is greater than the aforesaid range, the transparency and the flexibility of the multilayer film is reduced. On the other hand, if the proportion of the high-density polyethylene is less than the aforesaid range, it will be impossible to sufficiently provide the effect of further improving the heat resistance of the first layer 1, the effect of further improving the mold releasability in the heat sealing, and other effects provided by the mixing of the high-density polyethylene.

The thickness of the first layer 1 is not particularly limited, but is preferably 5 to 20%, more preferably 5 to 15%, of the overall thickness of the multilayer film. If the percentage of the thickness of the first layer 1 is less than the aforesaid range, the resulting multilayer film and the resulting drug container are insufficient in mechanical strength and heat resistance. On the other hand, even if the percentage of the thickness of the first layer 1 is greater than the aforesaid range, there is no significant change in mechanical strength and heat resistance, but rather the multilayer film is liable to have poorer flexibility.

The second layer 2 is required to ensure satisfactory adhesion between the first layer (outermost layer) 1 and the third layer 3, and to impart the entire multilayer film with flexibility without impairing the gas barrier property and the impact resistance of the multilayer film.

The second layer 2 is composed of:
(C) a mixture containing a linear ethylene/α-olefin copolymer having a density of 0.860 to 0.920 g/cm$^3$ and a linear ethylene/α-olefin copolymer having a density of 0.930 to 0.950 g/cm$^3$ in a weight ratio of 95:5 to 40:60; or
(D) a mixture containing a linear ethylene/α-olefin copolymer having a density of 0.860 to 0.920 g/cm$^3$ and a polyethylene having a density of 0.955 to 0.970 g/cm$^3$ in a weight ratio of 95:5 to 80:20.

The linear ethylene/α-olefin copolymer having a density of 0.860 to 0.920 g/cm$^3$ for the mixture (C) or the mixture (D) is a linear very-low-density polyethylene, which is prepared with the use of a Ziegler catalyst or a metallocene catalyst.

The linear ethylene/α-olefin copolymer having a density of 0.860 to 0.920 g/cm$^3$ particularly preferably has a density of 0.890 to 0.915 g/cm$^3$ in the aforesaid range.

Exemplary α-olefins for the linear ethylene/α-olefin copolymer having a density of 0.860 to 0.920 g/cm$^3$ include α-olefins having 3 to 12 carbon atoms, among which butene-1 and hexene-1 are preferred.

A commercially available linear ethylene/α-olefin copolymer having a density of 0.860 to 0.920 g/cm$^3$ may be used, and specific examples thereof include linear very-low-density polyethylenes (linear very-low-density ethylene/butene-1 copolymers TOUGHMER (registered trade mark) A or P series) available from Prime Polymer Co., Ltd., and linear very-low-density polyethylenes (linear very-low-density ethylene/hexene-1 copolymers EVOLUE (registered trade mark) series) available from Prime Polymer Co., Ltd.

Examples of the linear ethylene/α-olefin copolymer having a density of 0.930 to 0.950 g/cm$^3$ for the mixture (C) include those described for the first layer. The linear ethylene/α-olefin copolymer having a density of 0.930 to 0.950 g/cm$^3$ particularly preferably has a density of 0.935 to 0.945 g/cm$^3$, further preferably about 0.940 g/cm$^3$, in the aforesaid range. Exemplary α-olefins for the linear ethylene/α-olefin copolymer having a density of 0.930 to 0.950 g/cm$^3$ include α-olefins having 3 to 12 carbon atoms, among which butene-1 and hexene-1 are preferred and butene-1 is further preferred.

A mixing weight ratio between the linear ethylene/α-olefin copolymer having a density of 0.860 to 0.920 g/cm$^3$ and the linear ethylene/α-olefin copolymer having a density of 0.930 to 0.950 g/cm³ in the mixture (C) is preferably 95:5 to 40:60, more preferably 95:5 to 45:55. If the proportion of the linear ethylene/α-olefin copolymer having a density of 0.860 to 0.920 g/cm³ is less than the aforesaid range, the adhesive strength (interlayer strength) between the first layer 1 and the third layer 3 is reduced. On the other hand, if the proportion of the linear ethylene/α-olefin copolymer having a density of 0.930 to 0.950 g/cm³ is less than the aforesaid range, the mechanical strength and the impact strength (impact resistance) of the multilayer film is reduced.

Examples of the polyethylene having a density of 0.955 to 0.970 g/cm³ for the mixture (D) include those described for the first layer. The polyethylene having a density of 0.955 to 0.970 g/cm³ particularly preferably has a density of about 0.965 g/cm³ in the aforesaid range.

A mixing weight ratio between the linear ethylene/α-olefin copolymer having a density of 0.860 to 0.920 g/cm³ and the polyethylene having a density of 0.955 to 0.970 g/cm³ in the mixture (D) is preferably 95:5 to 80:20, more preferably 95:5 to 85:15. If the proportion of the linear ethylene/α-olefin copolymer having a density of 0.860 to 0.920 g/cm³ is less than the aforesaid range, the adhesive strength (interlayer strength) between the first layer 1 and the third layer 3 is reduced. On the other hand, if the proportion of the polyethylene having a density of 0.955 to 0.970 g/cm³ is less than the aforesaid range, the mechanical strength and the impact strength (impact resistance) of the multilayer film is reduced.

The use of the mixture (C) or the mixture (D) as the material for the second layer makes it possible to provide a drug container improved in strength and transparency.

The thickness of the second layer 2 is not particularly limited, but is preferably 30 to 60%, more preferably 40 to 50%, of the overall thickness of the multilayer film.

The second layer 2 may have a thickness that is greater than the thickness of the fourth layer 4 to be described later, for example, twice or more times the thickness of the fourth layer 4, in order to suppress the exudation of additives into the inside of the drug container while maintaining the mechanical strength of the multilayer film.

Alternatively, the second layer 2 may have the same thickness as the fourth layer 4 to be described layer in order to facilitate the production of the multilayer film to reduce the production costs.

The third layer serving as an intermediate layer of the drug container is required to be excellent in gas barrier property and contamination resistance.

The third layer 3 is composed of:
(E) a polycycloolefin; or
(F) a mixture containing a polycycloolefin and a polyethylene.

This imparts the multilayer film with an excellent gas barrier property and a higher contamination resistance, and suppresses penetration of moisture (particularly, steam) through the multilayer film. Particularly, where the third layer 3 is composed of the mixture (F), the multilayer film has a higher adhesive strength (interlayer strength) between the second layer 2 and the fourth layer 4 and a higher mechanical strength, further improving the impact strength and the mechanical strength of the drug container.

The polycycloolefin is a cycloolefin-containing polymer, and examples thereof include cycloolefin polymers (COPs) and cycloolefin copolymers (COCs). The polycycloolefin to be used may be a single (co)polymer selected from the COPs and the COCs, or a mixture of two or more (co)polymers selected from the COPs and the COCs and different in melting point, melt flow rate, density and the like.

Examples of the COPs include ring-opening polymers of a cyclopentadiene compound, ring-opening polymers of a dicyclopentadiene compound and ring-opening polymers of a norbornene compound, and hydrogenation products of these ring-opening polymers.

An example of the cyclopentadiene compound for the COPs is cyclopentadiene. Examples of the dicyclopentadiene compound include dicyclopentadiene and 2,3-dihydrodicyclopentadiene.

Examples of the norbornene compound include 2-norbornene, 5-methyl-2-norbornene, 5,5-dimethyl-2-norbornene, 5-ethyl-2-norbornene, 5-butyl-2-norbornene and 5-ethylidene-2-norbornene.

Examples of the COCs include: ring-opening copolymers of two or more cyclopentadiene compounds, ring-opening copolymers of two or more dicyclopentadiene compounds and ring-opening copolymers of two or more norbornene compounds, and hydrogenation products of these ring-opening copolymers; ring-opening copolymers of at least two cycloolefins selected from the group consisting of a cyclopentadiene compound, a dicyclopentadiene compound and a norbornene compound, and hydrogenation products of these ring-opening copolymers; and copolymers of a linear olefin and at least one cycloolefin selected from the group consisting of a cyclopentadiene compound, a dicyclopentadiene compound and a norbornene compound, and hydrogenation products of these copolymers.

Examples of the cyclopentadiene compound, the dicyclopentadiene compound and the norbornene compound for the COCs include those described for the COPs.

Examples of the linear olefin for the COCs include ethylene and α-olefins having 3 to 12 carbon atoms such as propylene, butene-1, pentene-1, hexene-1, 4-methylpentene-1, heptene-1, octene-1, nonene-1, decene-1, undecene-1 and dodecene-1, among which ethylene is preferred. These linear olefins may be used either alone or in combination.

The physical properties of the polycycloolefin are not particularly limited, but the glass transition temperature (Tg) of the polycycloolefin is preferably not lower than 70° C., more preferably 80° C. to 150° C. as measured in conformity with JIS K7121. The number average molecular weight (Mn) of the polycycloolefin is preferably 10,000 to 100,000, more preferably 20,000 to 50,000, as measured by a gel permeation chromatography (GPC) analysis using cyclohexane as a solvent. The hydrogenation ratio is preferably not less than 90%, more preferably not less than 95%, further more preferably 99% to 100%. In the following description, the glass transition temperatures of the polycycloolefins are measured in conformity with JIS K7121.

A commercially available polycycloolefin may be used, and specific examples thereof include APEL (registered trade mark) series available from Mitsui Chemicals, Inc., ZEONOR (registered trade mark) series available from Nippon Zeon Corporation, and TOPAS (trade name) series available from Ticona GmbH.

Where the third layer 3 is composed of the mixture (F), examples of the polyethylene include a high-density polyethylene, a low-density polyethylene produced by a high pressure method, and a linear low-density polyethylene. For the transparency of the overall multilayer film, a linear polyethylene is particularly preferred, and a linear polyethylene having a density of 0.930 to 0.965 g/cm³ is more preferred. Further, an ethylene/α-olefin copolymer may be used as the polyethylene. In this case, examples of the ethylene/α-olefin copolymer include a linear ethylene/α-olefin copolymer having a density of 0.930 to 0.950 g/cm³, and a linear ethylene/α-olefin copolymer having a density of 0.860 to 0.920 g/cm³.

Particularly, a linear ethylene/α-olefin copolymer having a density of 0.930 to 0.950 g/cm³ is preferred.

The polyethylene for the mixture (F) preferably has an MFR of 0.5 to 20 g/10 minutes (at 190° C.), more preferably 1 to 10 g/10 minutes (at 190° C.). The polyethylene for the mixture (F) preferably has a melting point (Tm) of 120° C. to 135° C., more preferably 122° C. to 131° C.

A commercially available polyethylene may be used, and specific examples thereof include ULTZEX (registered trade mark) series such as ULTZEX (registered trade mark) 40203 available from Prime Polymer Co., Ltd., and NEOZEX (registered trade mark) series such as NEOZEX (registered trade mark) 65150 available from Prime Polymer Co., Ltd.

Where the third layer 3 is composed of the mixture (F), a mixing ratio between the polycycloolefin and the polyethylene is properly determined, for example, in consideration of the gas barrier property, the steam barrier property and the contamination resistance (additive exudation suppressing effect) of the multilayer film, the adhesive strength (interlayer strength) between the second layer and the fourth layer, and the mechanical strength of the multilayer film. The proportion of the polycycloolefin in the mixture (F) is not particularly limited, but preferably not greater than 30% by weight, more preferably 10 to 30% by weight.

The thickness of the third layer 3 is not particularly limited, but is preferably 5 to 15%, more preferably 6 to 12%, of the overall thickness of the multilayer film.

The fourth layer 4 is required to ensure satisfactory adhesion between the third layer 3 and the fifth layer (innermost layer) 5, and to impart the entire multilayer film with flexibility without impairing the gas barrier property and the impact resistance of the multilayer film.

The fourth layer 4 is composed of the same material as the second layer 2, i.e., composed of:

(C) a mixture containing a linear ethylene/α-olefin copolymer having a density of 0.860 to 0.920 g/cm³ and a linear ethylene/α-olefin copolymer having a density of 0.930 to 0.950 g/cm³ in a weight ratio of 95:5 to 40:60; or (D) a mixture containing a linear ethylene/α-olefin copolymer having a density of 0.860 to 0.920 g/cm³ and a polyethylene having a density of 0.955 to 0.970 g/cm³ in a weight ratio of 95:5 to 80:20.

The thickness of the fourth layer 4 is not particularly limited, but is preferably 30 to 60%, more preferably 40 to 50%, of the overall thickness of the multilayer film.

The thickness of the fourth layer 4 maybe smaller than the second layer 2 in order to suppress the exudation of the additives into the inside of the drug container while maintaining the mechanical strength of the multilayer film. For example, the thickness of the fourth layer 4 may be less than half the thickness of the second layer 2.

Alternatively, the fourth layer may have the same thickness as the second layer 2 in order to facilitate the production of the multilayer film to reduce the production costs.

The fifth layer 5 defines an innermost layer of the drug container. Therefore, the fifth layer 5 is preferably excellent in heat sealability, unsealability and antiblocking property.

The fifth layer 5 is composed of a mixture containing a polyethylene and a polypropylene in a weight ratio of 90:10 to 10:90. Since the mixture of the polyethylene and the polypropylene is thus used for the fifth layer 5, a weakly sealed portion having excellent unsealability can be formed by utilizing a difference in melting point between the polyethylene and the polypropylene.

Examples of the polyethylene for the fifth layer 5 include an ethylene/α-olefin copolymer and a polyethylene homopolymer. Particularly, the ethylene/α-olefin copolymer is preferred.

Examples of the ethylene/α-olefin copolymer include a linear ethylene/α-olefin copolymer having a density of 0.930 to 0.950 g/cm³, and a linear ethylene/α-olefin copolymer having a density of 0.860 to 0.920 g/cm³. Particularly, the linear ethylene/α-olefin copolymer having a density of 0.930 to 0.950 g/cm³ is preferred.

The polyethylene for the fifth layer 5 preferably has an MFR of 0.5 to 20 g/10 minutes (at 190° C.) more preferably 1 to 10 g/10 minutes (at 190° C.). The polyethylene for the fifth layer 5 preferably has a melting point (Tm) of 120° C. to 135° C., more preferably 122° C. to 131° C.

A commercially available polyethylene may be used, and specific examples thereof include ULTZEX (registered trade mark) series available from Prime Polymer Co., Ltd., and NEOZEX (registered trade mark) series available from Prime Polymer Co., Ltd.

Examples of the polypropylene for the fifth layer 5 include a polypropylene homopolymer and the like. Particularly, the polypropylene homopolymer is preferred.

A mixing ratio between the polyethylene and the polypropylene homopolymer is properly determined, for example, according to unsealability required for the weakly sealed portion. More specifically, a mixing weight ratio between the polyethylene and the polypropylene homopolymer is preferably 90:10 to 10:90, more preferably 80:20 to 20:80, particularly preferably 65:35 to 25:75.

For the fifth layer 5, another polymer such as an α-olefin elastomer may be mixed with the polyethylene and the polypropylene. The proportion of the α-olefin elastomer in the fifth layer 5 is not particularly limited, but is preferably not greater than 30% by weight, more preferably not greater than 10% by weight, based on the overall weight of the material for the fifth layer 5.

The thickness of the fifth layer 5 is not particularly limited, but is preferably 5 to 20%, more preferably 10 to 20%, of the overall thickness of the multilayer film. Where the fifth layer 5 has a thickness within the aforesaid range, it is possible to further improve the antiblocking property of the multilayer film without impairing the effects provided by the other layers.

The overall thickness of the multilayer film is not particularly limited, but is properly determined depending on the application and the use purpose of the multilayer film. Where the multilayer film is used for an infusion solution bag (for example, having a volume up to about 500 mL), a blood bag, an enteral nutrition bag, a fluid diet bag and other medical containers, the thickness of the multilayer film is typically 100 to 300 µm, preferably 100 to 220 µm, more preferably 160 to 200 µm.

A production method for the multilayer film is not particularly limited, but exemplary methods include a water-cooling or air-cooling co-extrusion inflation method, a co-extrusion T-die method, a dry lamination method and an extrusion lamination method, among which the water-cooling co-extrusion inflation method and the co-extrusion T-die method are preferred in consideration of the properties of the multilayer film, particularly, the transparency of the multilayer film, the economy of the production of the multilayer film and the cleanliness of the multilayer film.

In any of the aforesaid methods, the production of the multilayer film is carried out at a temperature at which the resins for the respective layers are meltable. If the temperature for the production is too high, the resins will be partly thermally decomposed, resulting in deterioration of the properties of the multilayer film due to presence of decomposition products. Therefore, the temperature for the production of the multilayer film is preferably 150 to 250° C., more preferably 170 to 200° C., but not limited thereto. Further, differences in MFR between the resins for the respective layers are preferably as small as possible for the transparency of the multilayer film.

The multilayer film is excellent in unsealability, transparency, mechanical strength, sterilization heat resistance, and resistance to contamination of the drug solution in contact with the fifth layer (innermost layer) (additive exudation suppressing effect). Therefore, the multilayer film is suitable as a material for medical containers such as infusion solution bags.

Figure 2:
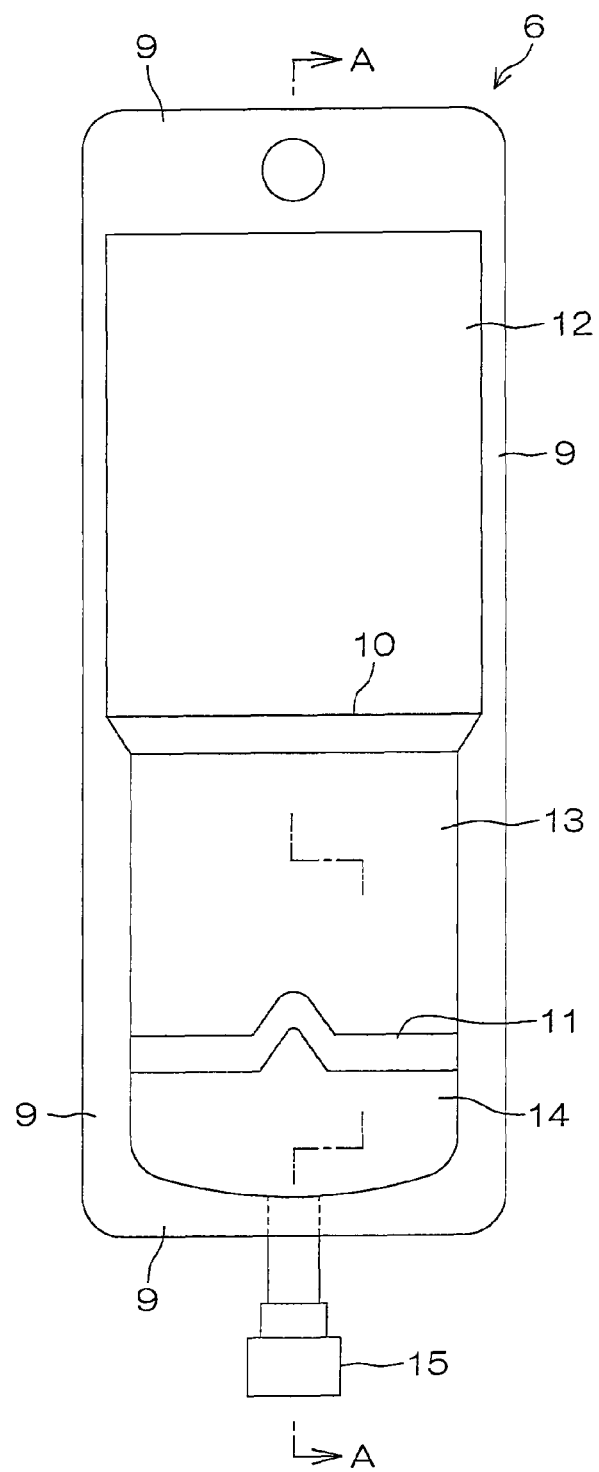
FIG. 2 is a front view showing a drug container according to a first embodiment of the present invention.
Figure 3:
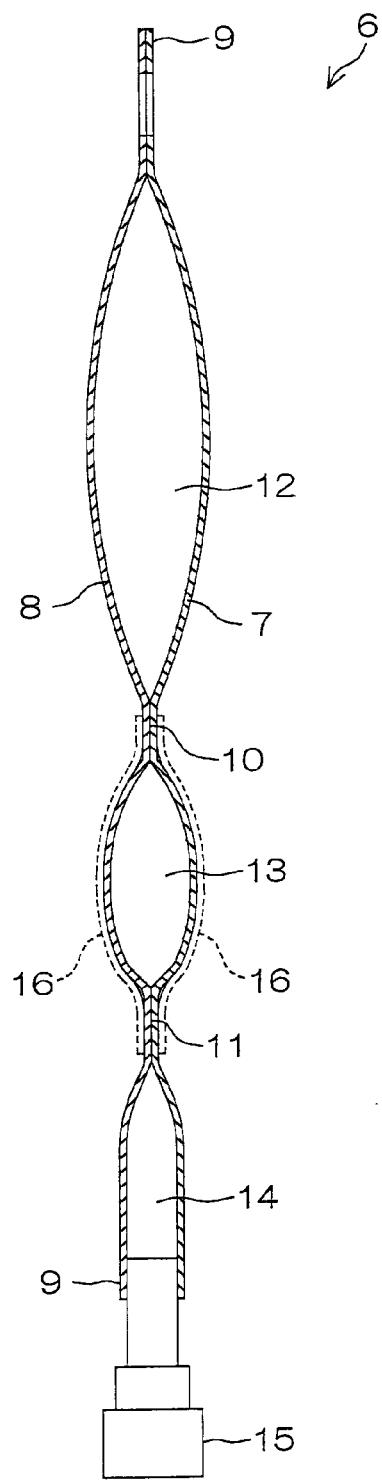
FIG. 3 is a sectional view of the drug container of FIG. 2 taken along a line A-A.

Referring to FIGS. 2 and 3, a drug container 6 includes a front side film 7 and a rear side film 8 each formed of the multilayer film shown in FIG. 1. The front side film 7 and the rear side film 8 are stacked one on the other with their fifth layers 5 opposed to each other. That is, the first layers 1 of the front side film 7 and the rear side film 8 serve as the outermost layer of the drug container 6, and the fifth layers 5 of the front side film 7 and the rear side film 8 serve as the innermost layer of the drug container 6.

The drug container 6 includes a heavily sealed portion 9 which is formed by fusion-bonding peripheral edge portions of the front side film 7 and the rear side film 8. The formation of the heavily sealed portion 9 may be achieved by forming the multilayer film shown in FIG. 1 in a bag shape or a tube shape with its fifth layer 5 facing inward by an inflation method, and fusion-bonding a peripheral edge portion of the bag-shaped or tube-shaped multilayer film.

A drug containing portion defined by the front side film 7, the rear side film 8 and the heavily sealed portion 9 of the drug container 6 includes three container portions, i.e., a first container portion 12, a second container portion 13 and a third container portion 14, which are isolated from each other by a first weakly sealed portion 10 and a second weakly sealed portion 11 each having unsealability.

A heat-sealing temperature for the formation of the heavily sealed portion 9 is not particularly limited, but is typically 120° C. to 160° C. Where the multilayer film has a thickness of about 180 µm, for example, a sealing period of 0.5 to 5 seconds are employed for the formation of the heavily sealed portion 9 at a temperature within the aforesaid temperature range.

The two weakly sealed portions 10, 11 are formed by fusion-bonding the fifth layers 5 of the front side film 7 and the rear side film 8. The sealing strength between the fifth layers is set such that the weakly sealed portions 10, 11 can be easily unsealed when one (e.g., the first container portion 12) of two adjacent container portions (e.g., the first container portion 12 and the second container portion 13 disposed adjacent to each other on opposite sides of the first weakly sealed portion 10) is pressed to increase the internal pressure of the one container portion 12.

A sealing temperature for the formation of the two weakly sealed portions 10, 11 is not particularly limited, but is typically 110° C. to 130° C. Where the front side film 7 and the rear side film 8 each have a thickness of about 180 µm, for example, a temperature within the aforesaid range and a sealing period of 0.5 to 5 seconds are employed for the formation of the two weakly sealed portions 10, 11.

As described above, the drug containing portion of the drug container 6 includes the three container portions, i.e., the first container portion 12, the second container portion 13 and the third container portion 14, isolated from each other by the two weakly sealed portions 10, 11. The use purposes of these three container portions 12, 13, 14 are not particularly limited. For example, it is preferred to use the first container portion 12 as a solvent containing portion which contains a solvent for a powdery drug, to use the second container portion 13 as a powdery drug containing portion which contains the powdery drug, and to use the third container portion 14 as an empty container portion.

The third container portion 14 is a portion kept in contact with a tube member 15 to be described later. Therefore, if the powdery drug were contained in the third container portion 14 of the drug containing portion, there would be a possibility that the powdery drug enters the tube member 15 to result in insufficient dissolution of the powdery drug in the solvent. Therefore, the third container portion 14 preferably serves as the empty container portion. Where the powdery drug and the solvent are contained in the drug container 6, it is preferred that the powdery drug is contained in one of the first container portion 12 and the second container portion 13 which is located closer to the third container portion 14 contacting the tube member 15, i.e., in the second container portion 13, and the solvent for the powdery drug is contained in the other container portion, i.e., in the first container portion 12. This prevents a wrong operation such as to discharge only the solvent from the drug container 6 without mixing the powdery drug with the solvent.

The tube member 15, which permits communication of a drug solution or the like between the drug containing portion and the outside of the drug container 6, is fusion-bonded to a part of the heavily sealed portion 9 between the front side film 7 and the rear side film 8.

The tube member 15 is not particularly limited, but a known tube member may be used. For example, the tube member 15 is a member which permits a drug solution contained in the drug containing portion (the first container portion 12, the second container portion 13 and the third container portion 14) of the drug container 6 to flow out of the drug container 6 and permits a drug solution to flow into the drug containing portion from the outside of the drug container 6. A sealing member (e.g., a rubber plug or the like) which seals the tube member 15 and is to be pierced by a hollow needle is typically provided in the tube member 15.

Where a drug (powdery drug) such as an antibiotic that is likely to be degraded by light, gas and the like is contained in the second container portion 13 of the drug container 6, a barrier film 16 for prevention of penetration of the light, the gas and the like may be provided on an outer surface of the second container portion 13 to cover the second container portion 13. The barrier film 16 is not particularly limited, but examples thereof include metal films such as an aluminum foil, and gas barrier films each having a deposition film such as of silica or alumina.

Since the drug container is formed of the inventive multilayer film with the outermost layer and the innermost layer thereof being defined by the first layer and the fifth layer, respectively, the drug container is excellent in unsealability, transparency, mechanical strength, sterilization heat resistance, antiblocking property, and resistance to contamination of the drug solution in contact with the fifth layer (innermost layer) (additive exudation suppressing effect). Therefore, the drug container is suitable as a medical container such as an infusion solution bag and, particularly, as a drug container for containing an antibiotic.

EXAMPLES

The present invention will hereinafter be described by way of examples thereof.

Abbreviated designations, properties and makers of resins employed for production of multilayer films will be first described.

Linear ethylene/α-olefin Copolymer Having a
Density of 0.930 to 0.950 g/cm³

PE-L: A linear polyethylene (linear ethylene/butene-1 copolymer) having a density of 0.940 g/cm³ and an MFR of 2.1 g/10 minutes (at 190° C.), and available under the trade name of ULTZEX (registered trade mark) 4020B from Prime Polymer Co., Ltd.

Polyethylene Having a Density of 0.955 to 0.970 g/cm³

PE-HD: A high-density polyethylene having a density of 0.965 g/cm³ and an MFR of 15 g/10 minutes (at 190° C.), and available under the trade name of NEOZEX (registered trade mark) 65150B from Prime Polymer Co., Ltd.

Linear ethylene/α-olefin Copolymer Having a
Density of 0.860 to 0.920 g/cm³

PE-LVLD(1): A linear very-low-density polyethylene (linear very-low-density ethylene/butene-1 copolymer) having a density of 0.885 g/cm³, a molecular weight distribution variance (Mw/Mn) of 2.0 and an MFR of 0.5 g/10 minutes (at 190° C.), and available under the trade name of TOUGHMER (registered trade mark) A0585XS from Prime Polymer Co., Ltd.
PE-LVLD(2): A linear very-low-density polyethylene (linear very-low-density ethylene/hexene-1 copolymer) prepared with the use of a metallocene catalyst, and having a density of 0.903 g/cm³, a molecular weight distribution variance (Mw/Mn) of 2.5 and an MFR of 1.3 g/10 minutes (at 190° C.), and available under the trade name of EVOLUE (registered trade mark) SP0510B from Prime Polymer Co., Ltd.

Polycycloolefin

COP: A polycycloolefin having a specific gravity of 1.01 (ASTM D792), an MFR of 20 g/10 minutes (at 190° C.) and a glass transition temperature of 105° C., and available under the trade name of ZEONOR (registered trade mark) 1020R from Nippon Zeon Corporation Polypropylene PP: A polypropylene homopolymer having a density of 0.910 g/cm³ and an MFR of 8.0 g/10 minutes (at 230° C.), and available under the trade name of PRIME POLYPRO (registered trade mark) J102WA from Prime Polymer Co., Ltd.

In the description of the resins, the weight average molecular weight (Mw) and the number average molecular weight (Mn) were each determined by gal permeation chromatography (GPC) on a polystyrene calibration basis. The molecular weight distribution variance (Mw/Mn) is the ratio of the weight average molecular weight (Mw) to the number average molecular weight (Mn), which is an index indicating the width of a molecular weight distribution.

Example 1

A multilayer film (see FIG. 1) including a 20-μm thick first layer 1 of PE-L, a 80-μm thick second layer 2 of a resin mixture containing PE-LVLD(1) and PE-L in a weight ratio of 50:50, a 10-μm thick third layer 3 of COP, a 40-μm thick fourth layer 4 of a resin mixture containing PE-LVLD(1) and PE-L in a weight ratio of 50:50, and a 30-μm thick fifth layer 5 of a resin mixture containing PE-L and PP in a weight ratio of 60:40, and having an overall thickness of 180 μm was produced by a water-cooling co-extrusion inflation method.

Then, two multilayer films thus produced as a front side film 7 and a rear side film 8 were stacked one on the other with their fifth layers opposed to each other, and a heavily sealed portion 9 was formed by sealing peripheral edge portions of the front side film 7 and the rear side film 8 at 185° C. for 3 seconds. Subsequently, an unsealable first weakly sealed portion 10 and an unsealable second weakly sealed portion 11 were formed in a drug containing portion defined by the front side film 7, the rear side film 8 and the heavily sealed portion 9. Sealing conditions for the formation of the first weakly sealed portion 10 and the second weakly sealed portion 11 were a sealing temperature of 146° C. and a sealing period of 3 seconds.

Thus, a drug container 6 having three container portions (12, 13, 14) as shown in FIGS. 2 and 3 was produced. The first container portion 12 of the container 6 had a maximum capacity of about 200 mL, and was filled with 100 mL of distilled water for evaluation of physical properties to be described later. The second container portion 13 had a maximum capacity of about 100 mL, and was filled with 50 mL of distilled water for the physical property evaluation to be described later. The third container portion 14 was an empty container portion.

Example 2

A multilayer film was produced in substantially the same manner as in Example 1, except that a resin mixture containing PE-L and PE-HD in a weight ratio of 80:20 was used for the first layer and a resin mixture containing COP and PE-L in a weight ratio of 75:25 was used for the third layer 3.

Then, a drug container 6 was produced in substantially the same manner as in Example 1, except that the multilayer film thus produced was used.

Example 3

A multilayer film was produced in substantially the same manner as in Example 1, except that the second layer 2 and the fourth layer 4 each had a thickness of 60 μm and a resin mixture containing COP and PE-L in a weight ratio of 75:25 was used for the third layer 3.

Then, a drug container 6 was produced in substantially the same manner as in Example 1, except that the multilayer film thus produced was used.

Example 4

A multilayer film (see FIG. 1) including a 20-μm thick first layer 1 of PE-L, a 80-μm thick second layer 2 of a resin mixture containing PE-LVLD(2) and PE-L in a weight ratio of 90:10, a 10-μm thick third layer 3 of COP, a 40-μm thick fourth layer 4 of a resin mixture containing PE-LVLD(2) and PE-L in a weight ratio of 90:10, and a 30-μm thick fifth layer 5 of a resin mixture containing PE-L and PP in a weight ratio of 60:40, and having an overall thickness of 180 μm was produced by a water-cooling co-extrusion inflation method.

Then, a drug container 6 was produced in substantially the same manner as in Example 1, except that the multilayer film thus produced was used.

Example 5

A multilayer film was produced in substantially the same manner as in Example 4, except that a resin mixture containing PE-L and PE-HD in a weight ratio of 80:20 was used for the first layer and a resin mixture containing COP and PE-L in a weight ratio of 75:25 was used for the third layer 3.

Then, a drug container 6 was produced in substantially the same manner as in Example 1, except that the multilayer film thus produced was used.

Example 6

A multilayer film was produced in substantially the same manner as in Example 4, except that a resin mixture containing PE-L and PP in a weight ratio of 40:60 was used for the fifth layer 5.

Then, a drug container 6 was produced in substantially the same manner as in Example 1, except that the multilayer film thus produced was used.

Example 7

A multilayer film was produced in substantially the same manner as in Example 4, except that a resin mixture containing PE-L and PP in a weight ratio of 30:70 was used for the fifth layer 5.

Then, a drug container 6 was produced in substantially the same manner as in Example 1, except that the multilayer film thus produced was used.

Example 8

A multilayer film (see FIG. 1) including a 20-μm thick first layer 1 of a resin mixture containing PE-L and PE-HD in a weight ratio of 80:20, a 80-μm thick second layer 2 of a resin mixture containing PE-LVLD(2) and PE-HD in a weight ratio of 90:10, a 10-μm thick third layer 3 of a resin mixture containing COP and PE-L in a weight ratio of 75:25, a 40-μm thick fourth layer 4 of a resin mixture containing PE-LVLD(2) and PE-HD in a weight ratio of 90:10, and a 30-μm thick fifth layer 5 of a resin mixture containing PE-L and PP in a weight ratio of 30:70, and having an overall thickness of 180 μm was produced by a water-cooling co-extrusion inflation method.

Then, a drug container 6 was produced in substantially the same manner as in Example 1, except that the multilayer film thus produced was used.

The layered structures of the multilayer films produced in Examples 1 to 8 are shown in Tables 1 and 2.

TABLE 1

|  | First layer | Second layer | Third layer | Fourth layer | Fifth layer |
|---|---|---|---|---|---|
| Example 1 | PE-L (0.940) 20 μm | PE-LVLD(1) + PE-L (0.885) (0.940) 50:50 80 μm | COP 10 μm | PE-LVLD(1) + PE-L (0.885) (0.940) 50:50 40 μm | PE-L + PP 60:40 30 μm |
| Example 2 | PE-L + PE-HD (0.940) (0.965) 80:20 20 μm | PE-LVLD(1) + PE-L (0.885) (0.940) 50:50 80 μm | COP + PE-L 75:25 10 μm | PE-LVLD(1) + PE-L (0.885) (0.940) 50:50 40 μm | PE-L + PP 60:40 30 μm |
| Example 3 | PE-L (0.940) 20 μm | PE-LVLD(1) + PE-L (0.885) (0.940) 50:50 60 μm | COP + PE-L 75:25 10 μm | PE-LVLD(1) + PE-L (0.885) (0.940) 50:50 60 μm | PE-L + PP 60:40 30 μm |

TABLE 2

|  | First layer | Second layer | Third layer | Fourth layer | Fifth layer |
|---|---|---|---|---|---|
| Example 4 | PE-L (0.940) 20 μm | PE-LVLD(2) + PE-L (0.903) (0.940) 90:10 80 μm | COP 10 μm | PE-LVLD(2) + PE-L (0.903) (0.940) 90:10 40 μm | PE-L + PP 60:40 30 μm |
| Example 5 | PE-L + PE-HD (0.940) (0.965) 80:20 20 μm | PE-LVLD(2) + PE-L (0.903) (0.940) 90:10 80 μm | COP + PE-L 75:25 10 μm | PE-LVLD(2) + PE-L (0.903) (0.940) 90:10 40 μm | PE-L + PP 60:40 30 μm |
| Example 6 | PE-L + PE-HD (0.940) (0.965) 80:20 20 μm | PE-LVLD(2) + PE-L (0.903) (0.940) 90:10 80 μm | COP + PE-L 75:25 10 μm | PE-LVLD(2) + PE-L (0.903) (0.940) 90:10 40 μm | PE-L + PP 40:60 30 μm |
| Example 7 | PE-L + PE-HD (0.940) (0.965) 80:20 20 μm | PE-LVLD(2) + PE-L (0.903) (0.940) 90:10 80 μm | COP + PE-L 75:25 10 μm | PE-LVLD(2) + PE-L (0.903) (0.940) 90:10 40 μm | PE-L + PP 30:70 30 μm |
| Example 8 | PE-L + PE-HD (0.940) (0.965) 80:20 20 μm | PE-LVLD(2) + PE-HD (0.903) (0.965) 90:10 80 μm | COP + PE-L 75:25 10 μm | PE-LVLD(2) + PE-HD (0.903) (0.965) 90:10 40 μm | PE-L + PP 30:70 30 μm |

In the columns of the first to fifth layers in Table 1, the abbreviated designations of resins for each layer are shown in an upper line. The abbreviated designations of mixed resins for a resin mixture are connected by a symbol "+". A parenthesized value in the upper line indicates the density (g/cm³) of a resin. The mixing weight ratio of resins for a resin mixture is shown in a middle line. Further, the thickness of each layer is shown in a lower line.

Property Evaluation

The drug containers 6 obtained in Examples 1 to 8 were evaluated for the following properties.

Transparency

Samples for measurement were cut out of each of the multilayer films for the drug containers 6. The light transmittance of each of the measurement samples was measured at a wavelength of 450 nm in water before and after the measurement sample was subjected to a steam sterilization process at 110° C. for 40 minutes.

The light transmittance is preferably not less than 85% before the steam sterilization process (as indicated by a symbol "○" in Table 3). A sample having a light transmittance of less than 85% before the steam sterilization process is rated as unacceptable in transparency.

The light transmittance is preferably not less than 75% after the steam sterilization process (as indicated by a symbol "○" in Table 3). A sample having a light transmittance of less than 75% after the steam sterilization process is rated as unacceptable in transparency.

Unsealability

In the production of the drug containers 6, different heat-sealing temperatures in 1° C. increments in the range of 145° C. to 147° C. were employed for the formation of the first and second weakly sealed portions 10, 11. The first and second weakly sealed portions 10, 11 of each of the resulting drug containers 6 (each containing predetermined amounts of distilled water in the first container portion 12 and the second container portion 13) were unsealed for evaluation of the unsealability. As a result, a drug container imparted with excellent unsealability by employing any of the heat-sealing temperatures in the range of 145° C. to 147° C. for the formation of the first and second weakly sealed portions 10, 11 is rated as excellent (○), and a drug container imparted with unsatisfactory unsealability by employing at least one of the heat-sealing temperatures is rated as unacceptable (X). That is, a container having excellent unsealability even if being produced by employing the different heat-sealing temperatures is rated as excellent (○).

Heat Resistance

The drug containers 6 each containing distilled water in the first container portion 12 and the second container portion 13 were subjected to the steam sterilization process at 110° C. for 40 minutes. After the steam sterilization process, the drug containers 6 were each visually checked for deformation, breakage and unsealing. Based on the results of the check, the multilayer films were each evaluated for heat resistance on the basis of the following criteria.

○ (excellent): None of deformation, breakage and unsealing was observed, or neither breakage nor unsealing was observed but slight evidence of deformation was observed. In either case, the heat resistance was regarded to be excellent.

X (unacceptable): Evidence of deformation was observed, and breakage or unsealing was also observed.

The results of the property evaluation are shown in Table 3.

TABLE 3

| | Transparency | | Unseal- | Heat |
|---|---|---|---|---|
| | Before sterilization | After sterilization | ability | resistance |
| Example 1 | 86.5% ○ | 80.3% ○ | ○ | ○ |
| Example 2 | 85.0% ○ | 79.3% ○ | ○ | ○ |
| Example 3 | 85.0% ○ | 77.0% ○ | ○ | ○ |
| Example 4 | 87.5% ○ | 75.4% ○ | ○ | ○ |
| Example 5 | 88.2% ○ | 75.1% ○ | ○ | ○ |
| Example 6 | 88.1% ○ | 78.5% ○ | ○ | ○ |
| Example 7 | 89.4% ○ | 79.4% ○ | ○ | ○ |
| Example 8 | 86.3% ○ | 80.1% ○ | ○ | ○ |

While the present invention has been provided by way of exemplary embodiments thereof, these embodiments are merely illustrative but not limitative of the invention. It should be understood that modifications of the present invention apparent to those skilled in the art fall within the scope of the invention defined by the appended claims.

INDUSTRIAL APPLICABILITY

The inventive multilayer film is suitable, for example, as a material for medical containers such as infusion solution bags. The inventive drug container is suitable, for example, as a medical container such as an infusion solution bag, particularly as a drug container for containing an antibiotic.

What is claimed is:

1. A drug container comprising:
a front side film;
a rear side film superposed on the front side film; and
a drug containing portion defined between the front side film and the rear side film by an edge sealed portion;
the drug containing portion including a plurality of container portions including a powdery drug containing portion for containing a powdery drug and a solvent containing portion for containing a solvent for the powdery drug;
the container portions being isolated from each other by a peelable sealed portion which is unsealed when internal pressures of the container portions are increased by pressing one of the powdery drug containing portion and solvent containing portion, and the peelable sealed portion having an adhesion strength weaker than that of the edge sealed portion;
the front side film and the rear side film each including a first layer provided on an outermost side, a second layer provided on the first layer, a third layer provided on the second layer, a fourth layer provided on the third layer, and a fifth layer provided on the fourth layer and defining a seal surface of the front or rear side film;
the first layer being composed of a linear ethylene/α-olefin copolymer having a density of 0.930 to 0.950 g/cm³ or a mixture containing a linear ethylene/α-olefin copolymer having a density of 0.930 to 0.950 g/cm³ and a polyethylene having a density of 0.955 to 0.970 g/cm³ in a weight ratio of 70:30 to 90:10;
the second and fourth layers being each composed of a mixture containing a linear ethylene/α-olefin copolymer having a density of 0.860 to 0.920 g/cm³ and a linear ethylene/α-olefin copolymer having a density of 0.930 to 0.950 g/cm³ in a weight ratio of 95:5 to 40:60 or a mixture containing a linear ethylene/α-olefin copolymer having a density of 0.860 to 0.920 g/cm³ and a polyethylene having a density of 0.955 to 0.970 g/cm³ in a weight ratio of 95:5 to 80:20;

the third layer being composed of a polycycloolefin or a mixture of a polycycloolefin and a polyethylene; and the fifth layer being composed of a mixture containing a polyethylene and a polypropylene in a weight ratio of 90:10 to 10:90 wherein the second layer has a thickness that is not less than twice that of the fourth layer, the thickness of the second layer is 30 to 60% of an overall thickness of the front and rear side film, and the overall thickness of the front and rear side film is 100 to 300 μm.

2. The drug container according to claim 1, wherein the third layer is composed of the mixture of the polycycloolefin and the polyethylene, and the polyethylene is present in a proportion of not greater than 30% by weight based on a total weight of the mixture of the polycycloolefin and the polyethylene.

3. The drug container according to claim 1, wherein the fifth layer has a thickness that is 15 to 20% of the overall thickness of the front and rear side film.

4. A multilayer film comprising:
a first layer;
a second layer provided on the first layer;
a third layer provided on the second layer;
a fourth layer provided on the third layer; and
a fifth layer provided on the fourth layer;

the first layer being composed of a linear ethylene/α-olefin copolymer having a density of 0.930 to 0.950 g/cm$^3$ or a mixture containing a linear ethylene/α-olefin copolymer having a density of 0.930 to 0.950 g/cm$^3$ and a polyethylene having a density of 0.955 to 0.970 g/cm$^3$ in a weight ratio of 70:30 to 90:10;

the second and fourth layers being each composed of a mixture containing a linear ethylene/α-olefin copolymer having a density of 0.860 to 0.920 g/cm$^3$ and a linear ethylene/α-olefin copolymer having a density of 0.930 to 0.950 g/cm$^3$ in a weight ratio of 95:5 to 40:60 or a mixture containing a linear ethylene/α-olefin copolymer having a density of 0.860 to 0.920 g/cm$^3$ and a polyethylene having a density of 0.955 to 0.970 g/cm$^3$ in a weight ratio of 95:5 to 80:20;

the third layer being composed of a polycycloolefin or a mixture of a polycycloolefin and a polyethylene; and the fifth layer being composed of a mixture containing a polyethylene and a polypropylene in a weight ratio of 90:10 to 10:90 wherein the second layer has a thickness that is not less than twice that of the fourth layer, the thickness of the second layer is 30 to 60% of an overall thickness of the multilayer film, and the overall thickness of the multilayer film is 100 to 300 μm.

* * * * *